Figure 1:
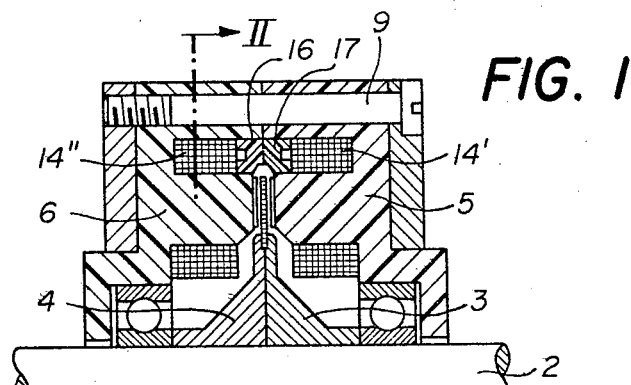

United States Patent [19]

Oudet

[11] 4,330,727
[45] May 18, 1982

[54] ELECTRIC STEP MOTOR

[76] Inventor: Claude Oudet, 12, rue Capitaine Arrachart, 25000 Besancon, France

[21] Appl. No.: 107,640

[22] Filed: Dec. 27, 1979

[51] Int. Cl.³ .............................................. H02K 1/18
[52] U.S. Cl. ..................................... 310/268; 310/43
[58] Field of Search ................. 310/268, 49, 162, 237, 310/43, 269, 162, 156, 254, 163

[56] References Cited

U.S. PATENT DOCUMENTS 2,730,953  1/1956  Pensabene ........................... 310/268
3,803,431  1/1974  Inaba et al. ......................... 310/268

Primary Examiner—J. D. Miller
Assistant Examiner—D. L. Rebsch
Attorney, Agent, or Firm—Cushman, Darby & Cushman

[57] ABSTRACT

An electric step motor has a disc-shaped, axially magnetized rotor part exhibiting 2 N alternating magnetic poles on either side thereof, and a stator comprising two groups of elementary magnetic circuits each circuit forming an air gap for co-operation with said magnetized rotor part. Each elementary circuit is coupled with at least one electric coil of a plurality of electric coils, each coil being coupled with a plurality of elementary circuits of one of the groups of elementary circuits.

5 Claims, 3 Drawing Figures

ELECTRIC STEP MOTOR

The present invention relates to electric step motors and more particularly to step motors effecting a high number of steps per turn.

A primary object of the invention is to provide a step motor of this kind which has an outstanding torque-to-weight ratio, a high angular acceleration and offers very good precision of the stepping operation.

A further object of the invention is to provide a high-performance step motor of a relatively simple and economic structure.

In accordance with the invention, a step motor has a disc-shaped rotor part of permanent magnetic material which is magnetized in substantially axial direction to exhibit on either side thereof, along an annular zone, 2 N regularly arranged magnetic poles of alternating polarity. This rotor part is mounted for rotation upon an axial shaft of the motor, which further comprises a plurality of elementary magnetic circuits and at least two electric coils coupled to said elementary circuits. Each of the elementary magnetic circuits has an air gap, all of these air gaps being formed at the same radial distance from the motor axis and each air gap being further substantially symmetrical with respect to a common radial plane containing the rotor part. The elementary magnetic circutis form at least two groups in each of which the air gaps are arranged with an angular spacing of $2\pi K/N$. Each elementary circuit is coupled with a least one of said electric coils and each coil is coupled with a plurality of elementary circuits of one of said groups.

The motor structure according to the invention allows one to achieve very short magnetic circuits in which the losses of magnetic energy are minimized. In addition, the structure provides for a large variation of the operating point of the permanent magnet in each elementary magnetic circuit, which results in a high output torque at a relatively low weight of the motor. A high number of steps can be realized and the electric time constant is reduced. An extremely small mutual induction between the coils of different phases of a multi-phase step motor further contributes to the high performance thereof.

Figure 3:
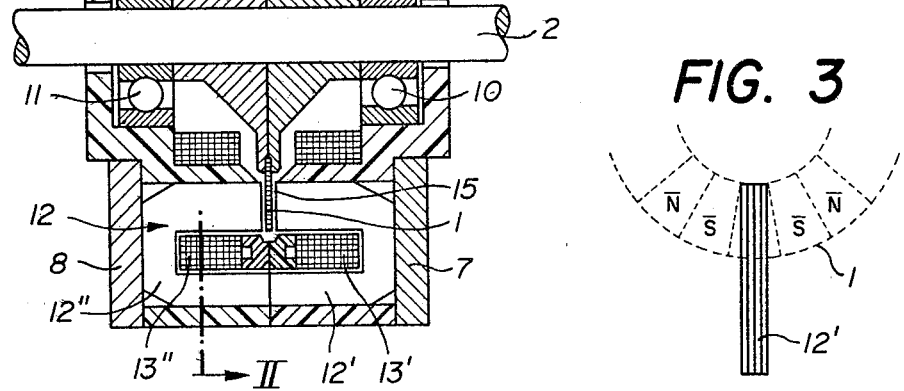
Figure 2:
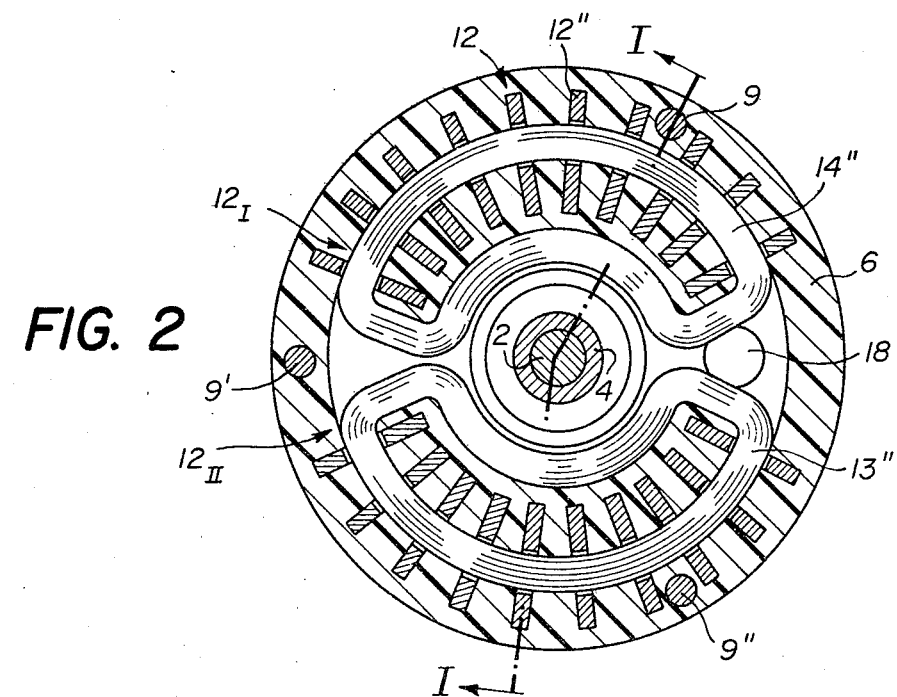

The invention shall now be explained in more detail with reference to a preferred embodiment as shown in the attached drawings, wherein:

FIG. 1 is an axially sectional view of a two-phase step motor in accordance withe the invention, along line I—I of FIG. 2, FIG. 2 is a sectional view of the motor along line II—II of FIG. 1, FIG. 3 is a schematic plan view of an elementary magnetic circuit with individual associated coil and cooperating rotor part.

Referring to FIGS. 1 and 2, a step motor is shown which comprises an annular disc-shaped rotor part 1 mounted on a shaft 2 by means of a pair of rotor members 3, 4. Members 3, 4 are pressed onto the shaft 2 to support at their peripheral parts the thin, annular rotor part 1 made of permanent-magnetic material. As will be seen from FIG. 1, the motor has a substantially symmetric structure with respect to a radial plane containing rotor part 1. Two supporting members 5, 6 of a non-magnetic material, for example of plastic, are arranged in axially facing relationship and are held together by means of annular flanges 7, 8 and screws 9, 9', 9''. The motor shaft 2 is mounted for rotation by means of bearings 10, 11 lodged in supporting members 5, 6.

A plurality of elementary magnetic circuits 12 as well as electric coils 13', 13'', 14', 14'' are supported by the supporting members 5, 6.

Each elementary magnetic circuit 12 comprises two U-shaped thin stator parts 12', 12'' of high magnetic permeability arranged in axially facing relationship and extending radially. A first, outer U-leg of each stator part 12' has its end-face in contact with the corresponding end-face of a first U-leg of the opposite stator part 12'', while the second, inner U-legs of said stator parts have their end-faces spaced from each other to form an air gap 15 therebetween. The stator parts can be made of plain soft iron or have a laminated structure for further improvement of the circuit quality.

As shown in FIG. 2 the elementary magnetic circuits are divided into two groups, $12_I$ and $12_{II}$, in each of which ten stator parts are equally angularly spaced by an angle of $2\pi k/N$, where k is a whole number and N the number of pairs of rotor poles as will be explained below. In the embodiment shown k=1 and N=25.

The p groups of elementary circuits are furthermore angularly shifted with respect to each other by an angle of $2\pi r/N \pm \pi/pN$ to assure proper operation of a multiphase motor, r being a whole number. In the embodiment shown r=3,4 and p=2. In the present embodiment, two electric coils are coupled with each elementary magnetic circuit and the ten circuits of each group $12_I$, $12_{II}$ are coupled together to the two respective coils 14', 14'' and 13', 13'', respectively. As shown in the figures, the coils are arranged around the U-legs of stator parts defining the air gaps and their curved shape assures that they are placed most closely to the respective legs. Furthermore, the section of the coils nearly entirely fills the hole between the two U-legs of each stator part.

Only a small space is left inside the said holes, in which rings 16, 17 are placed for holding the coils and guiding the connection wires thereof. These connection wires are then led through a hole 18 in flange 7.

The above described way of arranging the electric coils provides for very good coupling with the respective elementary circuits, shortest possible magnetic flux lines inside the magnetic circuits and extremely weak coupling between the coils associated to both phases, namely coils 13', 13'' and 14', 14'', respectively.

FIG. 3 shows an individual elementary magnetic circuit 12', 12'' of laminated structure, the U-legs of each stator part forming the above mentioned air gap. FIG. 3 also shows, schematically, a peripheral annular zone of the rotor part 1, of hard magnetic material which is axially magnetized to exhibit 2 N magnetic poles of alternating polarity on either side thereof, such as the poles indicated "N" and "S".

Another embodiment of the invention consists in combining two or more motor stages to form a two-phase or multi-phase motor, each stage being similar to the motor of FIGS. 1 and 2. The shaft of such a motor is common and the rotor members of the rotors of each stage are fixed on this common shaft. Preferably, each stage contains only one group of elementary circuits corresponding to one phase. In practice, to assure the proper phase relationship between the different phases, the stator supporting members with the elementary magnetic circuits and coils of each motor stage are adapted to be capable of being angularly shifted with respect to the other stages. For instance, the proper angular position is determined by mechanically driving the motor shaft and measuring and comparing the voltages induced in the various stages.

As will be apparent from the above description, the design of the elementary magnetic circuits and the co-operating rotor part in the form of a thin disc allows obtaining a large variation of the magnetic field in said magnetic circuits and therefore a high torque per unit weight of the motor. The design also provides for a high angular acceleration of the rotor, which is limited in practice by the inductance of the coils.

A high number of steps is achievable by providing a convenient number of poles on the rotor part, which can be of relatively large diameter as compared with the motor dimensions. In the embodiment of FIGS. 1 and 2, for instance, 100 steps can be achieved per turn when controlling coils 13', 13" and 14', 14", by currents producing a four step input sequence or 200 steps can be obtained by controlling coils by currents producing an eight step input sequence.

I claim:

1. An electric step motor comprising a disc-shaped rotor part of permanent-magnetic material which is magnetized in substantially axial direction to exhibit on either side thereof, along an annular zone 2 N regularly arranged magnetic poles of alternating polarity, which rotor part is mounted for rotation upon an axial shaft of the motor, said motor further comprising a plurality of magnetically isolated elementary magnetic circuits mounted in non-magnetic material and at least two electric coils coupled to said elementary circuits, each of said elementary magnetic circuits having an air gap, all of said air gaps being formed at the same radial distance from the motor axis, each air gap being further substantially symmetrical with respect to a common radial plane containing said rotor part, each elementary magnetic circuit comprising at least one flat radially extending U-shaped stator part of high magnetic permeability, said plurality of elementary circuits forming at least two groups in each of which the air gaps are arranged with an angular spacing of $2\pi k/N$, k being a whole number, each elementary circuit being coupled with at least one of said electric coils and each coil being coupled with a plurality of elementary circuits of one of said groups.

2. A step motor as claimed in claim 1, comprising p groups of elementary magnetic circuits, wherein the outer circuits of each group are angularly spaced by $2\pi r/N \pm \pi/pN$, r being a whole number.

3. An electric step motor comprising at least two disc-shaped rotor parts each of which is made of permanent-magnetic material magnetized in substantially axial direction to exhibit on either side thereof, along an annular zone, 2 N regularly arranged magnetic poles of alternating polarity, which rotor parts are mounted for rotation upon a common axial shaft of the motor, said motor further comprising at least two groups of magnetically isolated elementary magnetic circuits and at least two electric coils coupled to said elementary circuits mounted in non-magnetic material, each of said elementary magnetic circuits having an air gap, all of said air gaps being formed at the same radial distance from the motor axis, one group of elementary magnetic circuits being associated to each one of said rotor parts to form a corresponding stage of the motor, the air gaps of the elementary circuits of each group being arranged substantially symmetrically with respect to a radial plane common to all said elementary circuits of said group and containing a corresponding rotor part, each elementary magnetic circuit comprising at least one flat radially extending U-shaped stator part of high magnetic permeability, said air gaps of each group being arranged with an angular spacing of $2\pi k/N$, k being a whole number, each elementary circuit being coupled with at least one of said electric coils and each coil being coupled with a plurality of elementary circuits of one of said groups.

4. A step motor as claimed in claim 3, wherein the group of elementary circuits of a motor stage is capable of being angularly shifted with respect to the group of elementary circuits of another motor stage.

5. An electric step motor comprising a disc-shaped rotor part of permanent-magnetic material which is magnetized in substantially axial direction to exhibit on either side thereof, along an annular zone, 2 N regularly arranged magnetic poles of alternating polarity, which rotor part is mounted for rotation upon an axial shaft of the motor, said motor further comprising a plurality of pairs of stator parts, each of said pairs forming an elementary magnetic circuit, at least a first, a second, and a fourth electric coil coupled to said elementary magnetic circuits, and first and second non-magnetic supporting members for supporting said stator parts and said coils, each of said pairs of stator parts comprising a first and a second flat, U-shaped stator part of high magnetic permeability, said first and second stator parts of each pair being arranged in a same axial plane of the motor, each pair magnetically isolated from the other pairs, the end-face of a first U-leg of said first stator part of each pair being arranged in contacting relationship with the end-face of a first U-leg of said second stator part of the same pair, and the end-faces of the second U-legs of said first and second stator parts being arranged in axially facing, spaced relationship, so as to provide an air gap therebetween, said first stator parts being supported in said first supporting member and said second stator parts being supported in said second supporting member in such a position that the said air gaps are all formed at the same radial distance from the motor axis and are each substantially symmetrical with respect to a same radial plane containing said rotor part, said stator parts being further arranged to form at least a first and a second group of pairs of stator parts in which the said pairs are equally angularly spaced from each other by an angle of $2\pi k/N$, said first and second electric coils being arranged around all of said second U-legs of said first and said second stator parts, respectively, of said first group of pairs of stator parts, and said third and fourth electric coils being arranged around all of said second U-legs of said first and said second stator parts, respectively, of said second groups of pairs of stator parts.

* * * * *